United States Patent Office 3,269,822
Patented August 30, 1966

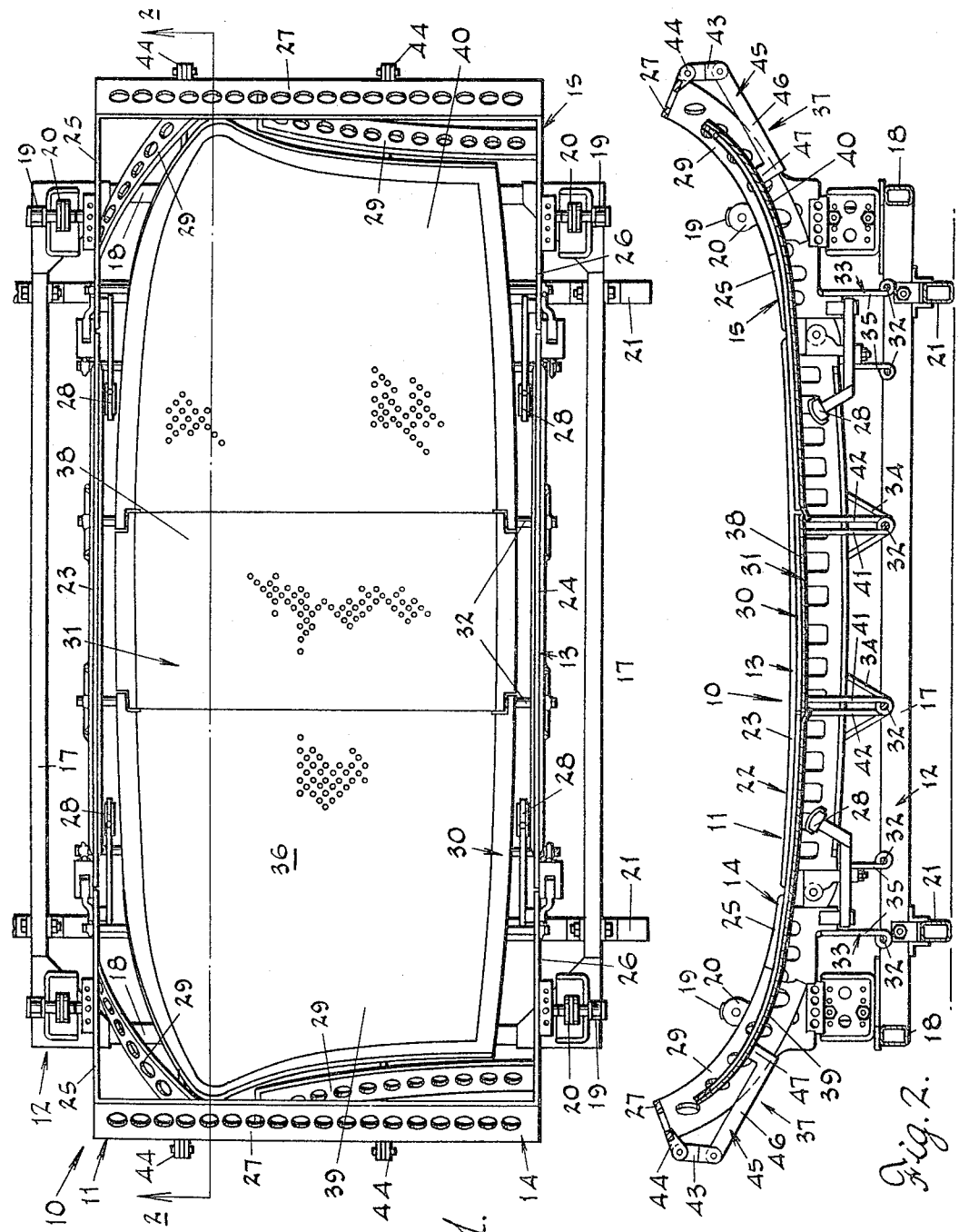

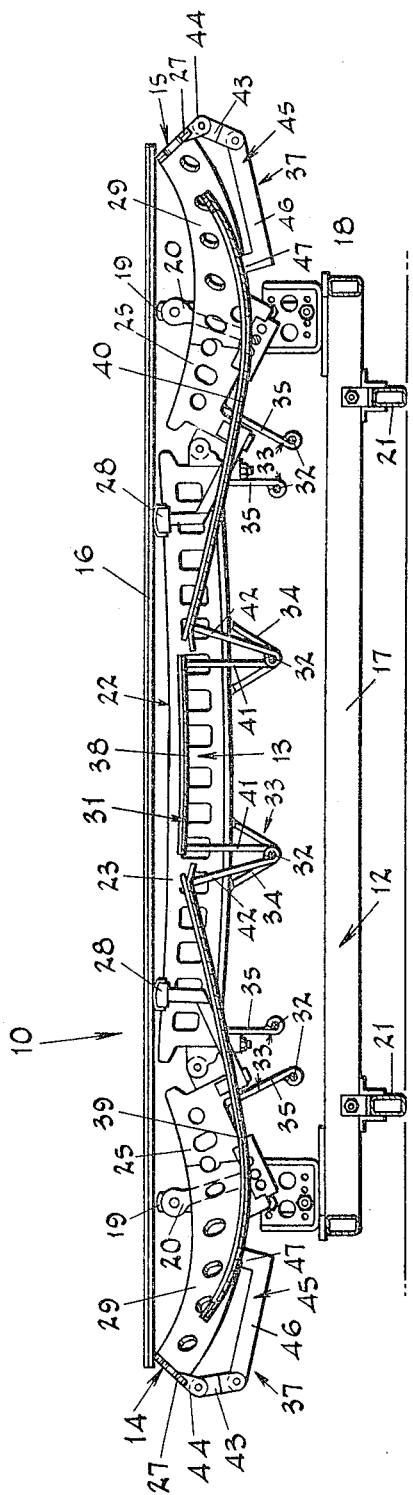
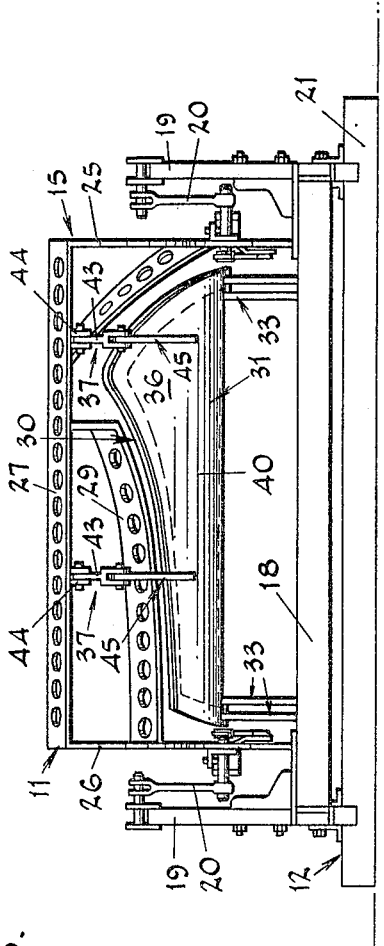
Fig. 3.
Fig. 4.
INVENTORS
Frank J. Carson and
BY David M. Etampler
Nobbe & Swope
ATTORNEYS

3,269,822
BENDING MOLD FOR BENDING GLASS SHEETS WITH HEAT DISTRIBUTOR
Frank J. Carson and David M. Wampler, Toledo, Ohio, assignors to Libbey-Owens-Ford Glass Company, Toledo, Ohio, a corporation of Ohio
Filed Nov. 3, 1961, Ser. No. 150,019
4 Claims. (Cl. 65—288)

The present invention relates generally to the bending of sheets or plates of glass and more particularly to the method and apparatus for producing curved glass sheets for use as glazing closures.

Generally stated, the bending of glass sheets into curved configurations is accomplished by supporting flat glass sheets on a so-called skeleton or ring-type mold having outwardly directed shaping surfaces conforming in outline and curvature to the glass sheets when bent. With the sheets thus supported thereon, the mold is passed through a heating means wherein the temperature of the sheets is raised to the softening point of glass permitting the sheets to sag under the influence of their own weight against the shaping surfaces.

As is generally known, the tendency for glass sheets to soften and bend depends directly on the temperature to which they are heated and if the temperature is not the same throughout the sheet, the cooler areas will not bend at the same rate and to the same curvature as the warmer areas. It is a rather common practice to utilize this principle when bending sheets to complex configurations having different radii of curvature in different areas of the sheet by applying concentrated heat to the relatively sharply curved areas thereby promoting more rapid softening and bending of the sheets in these areas. Even with sheets bent to complex configurations, however, it is, of course, necessary that the various curves blend into each other and that each curve has a constant radius of curvature throughout; in other words, that the individual curve be uniform. If a small area within a curve, for example, would be bent to even a slightly different curvature due to ununiform sagging of the glass sheet, optical distortion will result. To elaborate, it has been observed that if there is an area within the extremities of a single curve in a glass sheet, which area is at a lower temperature than the adjacent areas when the sheet bends, the curvature is somewhat less in the cooler area and, while the over-all bend may appear to be uniform when checked on a checking fixture or gauge, when looking through the finished sheet this cooler area will appear distorted. Naturally, when the bent sheet is intended for use as a glazing closure, it is desirable that it be free of all optical distortion.

Conventional skeleton type bending molds of the type used to bend glass sheets are commonly formed from relatively thin rail sections disposed generally edgewise with respect to the sheet supported thereon and with the aforementioned shaping surfaces formed on one edge. The various rail sections which make up the mold are secured together into a unitary structure by bridging members extending between the rail sections and across the mold. These bridging members are usually positioned relatively close to the shaping surface and underlie the glass sheets supported thereon.

It has been observed that these bridging members utilized to tie the rail sections together constitute an obstruction which interferes with the uniform heating of the glass sheet with the result that distortion may be noticed in the finished bent sheet in those areas which overlie the members even though the over-all curvature of the sheet appears to be uniform and continuous.

As indicated above, the problem of distortion is even more predominate in producing bent sheets of glass having different radii of curvature in different areas of the sheet. An example of such a configuration would be a so-called wrap around windshield or backlight which has relatively sharply curved opposite end portions joined by a slightly curved major or middle portion. These end portions or wings project at substantially right angles to the major portion thereby to blend pleasingly into the design of the modern automobile when the sheet is installed in the glazing opening by extending along the sides of the automobile. The bending of glass sheets into these multiple curve shapes require the use of a somewhat complicated bending mold of the so-called sectionalized type wherein portions of the mold move relative to each other between open and closed positions; the latter position defining the configuration of the bent sheet.

In general, sectionalized-type bending molds comprise two or more mold sections hinged together with each being constructed from rail sections arranged in a closed outline and tied together into a unitary structure by bridging members as described above. The areas in which the sections are hinged correspond to the areas of extreme curvature in the sheet and the bridging members in this area have been found to be particularly troublesome since the sharp curvature magnifies, as it were, any distortion caused thereby.

A well-known method of bending glass sheets for use as curved glazing closures is to bend the sheets in block size and subsequently trim them to the desired finished outline and size. With this method, a so-called strain bar extending around the outline of the mold and spaced inwardly of the shaping surfaces is utilized to control the strain pattern in the finished sheet. This strain bar functions by absorbing heat as the sheet is being heated and to release this heat to the glass when the sheet is cooled. Thus, it will be appreciated that wihle the strain bar performs a useful function during tempering of the sheet, during the heating of the sheet for bending it acts as an obstruction and thereby results in uneven heating and bending of the sheet.

It is, therefore, an important object of this invention to provide an improved method of bending glass sheets which are free of distortion caused by uneven bending.

Another object is to accomplish the foregoing by the provision of a bending mold constructed in a novel manner to permit even heating of the sheets to be bent.

Another object is to provide a new and improved bending mold of the above character having the bracing members significantly removed from the vicinity of the glass sheet as to facilitate even heating thereof.

Another object is to provide a mold in which the glass sheets supported thereon are shielded from the bracing members thereby promoting uniform heating of the entire glass sheet.

Another object is to accomplish the shielding by means of a heat distributing member disposed between the glass sheet and the bracing members.

Another object is to provide a bending mold having a strain bar incorporated therewith which strain bar is moved into and out-of-the-way position as the sheet is heated.

Another object is to mount a strain bar and shielding screen on a bending mold of the above-described character in a novel manner and through the medium of linkage permitting it to swing downwardly into an out-of-the-way position when the mold is in the open position and to move upwardly into an operative position automatically upon closing of the mold.

Other objects and advantages of the invention will become more apparent during the course of the following description when taken in connection with the accompanying drawings.

In the drawings, wherein like numerals are employed to designate like parts throughout the same:

FIG. 1 is a plan view of a bending apparatus embodying the novel features of the present invention;

FIG. 2 is a sectional view taken along line 2—2 in FIG. 1;

FIG. 3 is a sectional view similar to FIG. 2 but showing the mold in an open position; and FIG. 4 is an end elevational view of the bending apparatus.

For purposes of illustration, in the drawings is shown a bending apparatus 10 embodying the novel features of the present invention and comprising, generally, a sectionalized-type bending mold 11 supported on a rack 12. The mold 11 includes a central section 13 and two aligned and oppositely disposed end sections 14 and 15 interconnected in such a manner as to permit relative movement of the sections between the open and closed positions of the mold. The mold illustrated is adapted to bend glass sheets to be utilized as glazing closures in automobiles and, more particularly, to the wrap around type of glazing closures having, in general, a slightly curved major portion and rather sharply curved side and wing portions extending substantially at right angles to the major portion at the opposite ends thereof. The particular mold shown, for purposes of illustration only, is designed to bend laminated windshields for automobiles. These windshields may be described as a sandwich arrangement of two curved sheets of glass with a plastic interlayer disposed therebetween. For production purposes, the two sheets of glass 16 (FIG. 3) are supported on the bending mold and in stacked relationship and bent simultaneously.

A well-known process of bending sheets of glass to the above-described configurations includes supporting the glass sheets on a sectionalized bending mold while the latter is in the open position whereby the flat sheets, being rigid, act as a strut to hold the mold open. The mold and the sheets supported thereon are then passed through a suitable heating means such as a tunnel-type furnace wherein the temperature of the sheet is raised to the softening point of glass, enabling the sheets to sag under the influence of gravity toward curved shaping surfaces formed on the mold and to lose their rigidity permitting the mold sections to swing into the closed position.

With reference to FIGS. 1 and 2, the rack 12 supporting the mold 11 includes parallelly spaced longitudinal side rails 17 joined to one another at their opposite ends by end rails 18 to form a rigid, substantially rectangular frame. Vertical uprights 19 are fixed to the frame adjacent the four corners of the rack 12 and the mold 11 is suspended from links 20, each having one end pivoted to the upper end of one of the uprights and the opposite end attached to the end sections 14 and 15 of the mold. To support the rack 12 on a conveying means (not shown) of the type commonly used to move the apparatus through the furnace, transverse guide rails 21 are secured underneath the side rails adjacent the opposite ends thereof.

The mold 11, as pointed out above, includes a central section 13 and oppositely disposed end sections 14 and 15 pivoted together to swing relative to each other about horizontal axes between an open and a closed position. The mold is of the so-called ring or skeleton type having upwardly directed shaping surfaces 22 conforming in plan to the outline of the bent sheets and in elevation to the curvature of the bent sheets. The surfaces 22 are thus adapted to support the sheets by engagement with the marginal edge portions of the sheets only.

The central section 13 of the mold 11 comprises spaced shaping rails 23 and 24 with the shaping surfaces 22 being formed on their upper edge. Since these rails will receive the major or central portion of the sheet when bent, the shaping surfaces define a rather large radius of curvature and are thus operable to provide a shallow bend in this portion of the sheet.

The end sections 14 and 15 of the mold 11 are similar to each other in construction and include shaping rails with shaping surfaces formed on their upper side. Each end section comprises two upwardly curved rails 25 and 26 longitudinally aligned with the shaping rails 23 and 24 on the central section 13 of the mold and joined at their outer end by a transverse shaping rail 27 extending across the end of the mold.

When the mold 11 is in the open position as shown in FIG. 3, the transverse rails 27 at the opposite ends of the mold engage the ends of the flat sheet 16 supporting it above the curved shaping surfaces 22 of both the central 13 and end sections 14 and 15 of the mold. To support the sheet intermediate these two transverse rails 27, support members 28 are carried by the inner end of each of the opposed end sections at opposite sides of the mold and are adapted to move between a raised position wherein they engage the undersurface of the flat sheet 16 supported on the open mold and a lowered, out-of-the-way position below the shaping surfaces 22 on the central section 13 of the mold.

The movements of these support members 28 are controlled and activated by the opening and closing of the mold 11. Thus, when the mold is moved into the open position, the supports 28 move upwardly into their operative location and during the bending process move downwardly to their inoperative location as the mold swings into the closed position.

A somewhat common procedure in the manufacture of vehicle glazing closures of the type described above is to bend block size sheets of glass and to subsequently trim these block size sheets to the desired finished outline. To insure that the finished outline of the ends of the sheets will assume the desired curvature when bent, certain auxiliary shaping rails 29 are mounted on each end section 14 and 15 spaced inwardly from the transverse shaping rail 27 and substantially conforming in plan and curvature to the desired shape of the ends of the finished bent sheet. It will be appreciated that the transverse rail supports the ends of the block size sheets while they are passed through the bending furnace in the usual manner and upon being heated, the sheets sag against shaping surfaces formed on the auxiliary shaping rails.

In order to place the outer edges of the finished bent sheets in compression whereby they will be better able to withstand mishandling during shipment and mounting in the glazing opening, a so-called strain bar 30 is mounted on the mold to extend around the desired outline of the finished sheet and is spaced below and inwardly of the shaping surfaces 22 formed on the shaping rails. As set forth above, the function of the strain bar is to retard cooling of those portions of the sheet directly above it during tempering of the sheet and thus place those portions in tension. Since the shaping surfaces themselves perform substantially the same function, an area of tension will be formed in the sheet above both the strain bar and the shaping surfaces resulting in an intermediate area of compression. As a finishing operation, the sheet is cut to the desired size and outline through this area of compression whereby its outermost edge is in compression.

According to common practice, and in order to eliminate optical defects or distortions resulting from the continuous band of tension stress produced by the strain bar 30, the tensional stress is blended out toward the center of the sheet. For this purpose, an additional heat retaining member 31 having a different construction and composition and, therefore, different heat retaining properties than the strain bar itself, is mounted on the strain bar to extend inwardly therefrom toward the center of the mold. The member 31 usually comprises a web of metallic material fixed as by welding to the strain bar 30 and extending inwardly therefrom a sufficient distance to provide the desired blending out effect.

As shown in FIG. 1, all of the shaping rails comprise relatively thin flat members disposed on edge and having the shaping surfaces formed on one edge to contact the marginal edge portions of the sheet to be bent. These shaping rails are secured together into a unitary structure by a plurality of general transversely extending bridging members or tie rods secured at their opposite ends to the rails below the shaping surfaces so as to underlie the glass sheets supported thereon. It has been discovered that these tie rods interfere with the even heating of the glass sheets supported on the mold prior to bending. In this regard, it will be appreciated that any mass of material in the vicinity of the glass sheets will have an effect upon the heating of the sheets as they are passed through the heated atmosphere.

As mentioned above, in order to produce a smooth curvature, the glass sheets when heated should sag or bend at the same rate throughout. The rate or tendency of the sheet to bend is governed by the temperature of the sheet and, therefore, any areas, regardless of how small, which are cooler than the remainder of the sheet will not bend to the same degree as the remainder of the sheet. Thus, it has been found that those areas of the sheet directly overlying the tie rods utilized in the construction of the mold are not heated to the same temperature as the rest of the sheet and, therefore, do not bend to the same curvature. As is often the case, this deviation in curvature is not readily noticeable except in that it produces distortion when looking through the finished glazing closure. These areas of distortion are relatively narrow and extend transversley across the sheet directly above the tie bars of the mold.

To eliminate this defect in the finished sheet and thus to produce a curved glazing closure having improved optical qualities, the present invention contemplates a new and improved method and apparatus for bending glass sheets which promote uniform heating of the glass sheets and thereby uniform, distortion free, bending. To this end, the glass sheets are bent on a bending mold constructed in a novel manner to provide a rugged unitary structure which has substantially no adverse effect on the glass sheets bent thereon. To even further insure uniform heating and thus bending of the sheet, according to the method of the invention, the glass sheets are shielded from structural members of the mold underlying the sheets intermediate the shaping rails whereby the obstructing effect of these members are blended out permitting an even distribution of heat to the sheets.

For this purpose, the mold is constructed with bridging members and tie bars 32 which join the shaping rails disposed substantially below the shaping surfaces and thus below the glass sheets supported on the mold so as to have little or no effect thereon. This is accomplished by fixing the tie bars 32 to the shaping rails through the medium of lugs or brace members 33 projecting outwardly from the rails at the edge opposite the shaping surfaces. In a generally horizontal mold of the type illustrated, the braces depend from the lower edge of the shaping rails and the tie bars are secured at their opposite ends to the brace members. The distance the tie bars are moved downwardly away from the glass sheets is, of course, a function of the size and mass of the particular tie bars utilized; however, the minimum distance between the tie bars and the undersurface of the glass should be at least three and one-half inches.

As best shown in FIGS. 2 and 3, in the present instance, tie bars 32 of circular transverse cross section are utilized and are disposed transversely under the mold at four spaced points along the central section thereof and across the open end of each end section. Herein, the brace members 33 depending from the underside of the shaping rails are rigidly secured at their upper ends to the lower edge of the rails and are spaced apart along the opposed rails in transverse alignment. The tie bars span the aligned braces and are fixed thereto at their opposite ends.

As mentioned above, four tie bars are utilized on the central section, each extending transversely across the mold between four pairs of braces secured to the shaping rails. The two centrally located braces 34 are substantially V-shaped and are secured to the tie bars at the apex of the V and with each leg at the open end being secured as by welding to the underside of the shaping rail. The braces 35 at the opposite ends of the central section and at the free ends of the end sections comprise an elongated bar extending downwardly from the shaping rail and secured at opposite ends to the underside of the shaping rail and to the tie rod.

As was pointed out above, the areas of sharp curvature tend to accentuate any irregularities in the curve and thus, in effect, magnify any distortion caused thereby. For this reason, relatively sharply curved regions of the sheet may be considered as critical areas as regards even distribution of heat thereto. Therefore, to insure substantially even heating of these areas, according to the method of the invention, these areas of the glass sheets are shielded from the tie bars extending between the shaping rails by a heat distribution means disposed beneath the glass sheet 16 and above the tie bars 32.

In accordance with another aspect of this invention, the bending mold is constructed so that the entire undersurface of the sheet adjacent the critical area is shielded to provide, generally, over-all uniform heating at these areas. In other words, the mold is so constructed as to provide means facilitating a substantially even distribution of heat to the areas of the flat glass sheets prior to bending above the hinged portions of the mold which, as noted above, are areas in which the greatest curvature will be imparted to the sheet.

In general, a heat distributing means 36 is disposed within the confines of the shaping rails and between the glass sheet supported on the shaping surface of the mold and any structural element of the mold underlying the glass sheet within its outer periphery. Thus, in the present instance the heat distributing means 36 would overlie the tie rods on the central and end sections of the mold adjacent their interconnected ends. To permit opening and closing of the sectionalized-type mold, the shields are also divided into sections and are mounted to swing relative to each other with the mold sections as the latter move between the mold open and mold closed positions. The lines of joinder between the various sections of the shield are located so as to underlie the central portions of the sheets adjacent an area which, due to shallow curvature of the bend in the sheets, may be termed a non-critical area.

It has been found that an effective yet simply constructed heat distributing means 36 may be provided by extending the blending shields 31 associated with the strain bar 30 entirely across the mold within the confines of the strain bar. These blending shields, as noted above, comprise a heat absorbing material such as a metallic screen or the like.

Further, in accordance with the invention, the strain bar 30 and the heat distributing means 36 are mounted on the mold in a novel manner whereby they drop downwardly away from the shaping surfaces when the mold is in the opened position. This construction permits the strain bar and the shield to function in the desired manner during tempering of the sheet while at the same time minimizing their interference with the initial heating of the sheet supported on the mold prior to bending. Generally, this is accomplished by supporting the heat distributing means on the mold through a medium of a linkage arrangement 37 between the rail sections of the mold and the heat distributing means.

In the present instance, the heat distributing means 36, as mentioned above, extends across the mold within the confines of the strain bar so as to underlie substantially the entire glass sheet. In order that the mold 11 may open and close in the desired manner, the heat distributing means 36 is divided into three portions or sections; a central portion 38 and two opposed end portions 39 and 40. Since the heat distributing means is bounded by the strain bar, this bar is also divided into sections and, for purposes of description when referring herein to the portions of the heat distributing means, it will be understood that these portions include segments of this bar.

The central portion 38 of the heat distributing means is disposed adjacent to but below the shaping surfaces of the central section 13 of the mold and is rigidly mounted on the two centermost tie bars extending across the mold intermediate the ends of the central section. To mount the central portion, posts 41 extend upwardly from the tie bars to the four corners of the heat distributing means and are secured at their opposite ends to the tie bars and the means 36.

The end portions 39 and 40 of the heat distributing means 36 are disposed on opposite sides of the center portion 38 to form a substantial continuation thereof extending longitudinally of the mold. Each of the end portions 39 and 40 is pivoted at the end adjacent the central portion on the tie bar so as to swing about the bar as an axis. This is accomplished through the use of legs 42 disposed on opposite sides of the mold with each fixed at one end of the underside of an end portion and pivoted at the opposite end on the tie bar.

The linkage arrangement 37 permitting the heat distributing member to drop away from the undersurface of the sheet when the mold is in the opened position couples the outer end of each end section to the transverse shaping rail 27; two such linkage arrangements being provided at each end of the mold. Each linkage arrangement 37 comprises a short bar 43 pinned to a clevis 44 fixed to the transverse rail section to turn about an axis extending parallel to the rail. At the free end of this bar 43 is pivoted a L-shaped link 45 extending under a portion of the heat distributing member 36 with the end of one leg 46 of the L being pinned to the bar and the other end bieng securely attached to the undersurface of the heat distributing member. Thus, as shown in FIGS. 2 and 3, the strain bar 30 and the associated heat distributing member 36 is held by the linkage 37 in close proximity with the glass sheet when the mold is in the closed position but is permitted by the linkage to drop away from the shaping surfaces as the mold is moved to an opened position.

It will be appreciated that glass sheets bent into curved configurations in accordance with the present invention are substantially free of all optical distortion caused by uneven heating of the sheet prior to and during bending, which uneven heating would result in uneven bending. This is accomplished by bending the glass sheets on a bending mold constructed in a novel manner so as to minimize the adverse effects on the structural members of the mold upon heating the sheet and moreover by shielding the sheet from the structural members to provide even distribution of heat at least in the relatively sharply curved areas.

It is to be understood that the forms of the invention herewith shown and described are to be taken as illustrative embodiments only of the same, and that various changes in the shape, size and arrangement of parts, as well as various procedural changes may be resorted to without departing from the spirit of the invention.

We claim:

1. In apparatus for bending glass sheets, a mold comprising a plurality of movable mold sections disposed end to end, means supporting said mold sections for movement relative to each other between open and closed positions, each of said mold sections comprising spaced shaping rails having shaping surfaces formed on an upwardly directed edge thereof, said shaping surfaces conforming to the margin of a glass sheet bent thereon when said mold is in said closed position, a plurality of elongated bridging members extending across said mold and disposed below said shaping rails, means attaching said bridging members to said shaping rails, heat distributing means disposed between said shaping surfaces and said bridging members, means pivotally mounting portions of said heat distributing means on said shaping rails to move between a first position adjacent said shaping surfaces when said mold is in said closed position to a second position removed downwardly from said shaping surfaces when said mold is in said open position.

2. In apparatus for bending glass sheets, a mold having a plurality of mold sections disposed end to end and including oppositely disposed movable end sections and an intermediate section, means supporting said mold sections for movement between opened and closed positions, said mold sections comprising spaced shaping rails having shaping surfaces formed on upwardly directed edges thereof, said shaping surfaces substantially conforming in plan and outline to said sheet bent thereon when said sections are in the closed position, bridging members extending across said mold below said shaping rails, means securing said bridging members to said shaping rails, heat distributing means extending across said mold within the confines of said shaping rails, said heat distributing means including a central portion and two oppositely disposed end portions, said central portion being disposed intermediate the ends of said intermediate mold section, means securing said central portion to said intermediate section in a fixed position adjacent to but below said shaping surfaces, the end of each end portion adjacent said central portion being pivotally mounted intermediate the ends of said intermediate mold section to turn about a fixed axis, means coupling the opposite end of each end portion to one of said end sections to swing about said fixed axis between a first position adjacent to but below said shaping surfaces when said mold is in said closed position, and a second position removed downwardly from said shaping surfaces when said mold is in said open position.

3. In apparatus for bending glass sheets as defined in claim 2, in which each of said coupling means includes a bar pivoted at one end to the outer end of said one end section, a link having one end pivoted to the free end of said bar and the opposite end fixed to the outer end of said end portion.

4. In apparatus for bending glass sheets, a mold comprising a plurality of movable mold sections disposed end to end, means supporting said mold sections for movement relative to each other between open and closed positions, each of said mold sections comprising spaced shaping rails having shaping surfaces formed on upwardly directed edges thereof and conforming to the margin of the glass sheet bent thereon when said mold is in said closed position, a plurality of elongated bridging members extending across said mold between said shaping rails and disposed below said shaping rails, means attaching said bridging members to said shaping rails, a strain bar spaced inwardly of said shaping rails and below said shaping surfaces, and means pivotally mounting portions of said strain bar on said shaping rails to move between an operative position adjacent said shaping surfaces when said mold is in said closed position and an out-of-theway position removed downwardly from said shaping surfaces when said mold is in said open position.

References Cited by the Examiner

UNITED STATES PATENTS

| | | | |
|---|---|---|---|
| 2,736,140 | 2/1956 | Black | 65—291 |
| 2,857,713 | 10/1958 | Cleminson | 65—291 |
| 2,933,856 | 4/1960 | Barcikowski et al. | 65—291 |
| 2,963,822 | 12/1960 | Carson | 65—288 |
| 3,037,324 | 6/1962 | Carson | 65—288 |
| 3,086,376 | 4/1963 | Carson et al. | 65—288 |

DONALL H. SYLVESTER, *Primary Examiner.*

A. D. KELLOGG, *Assistant Examiner.*